Patented Sept. 20, 1932

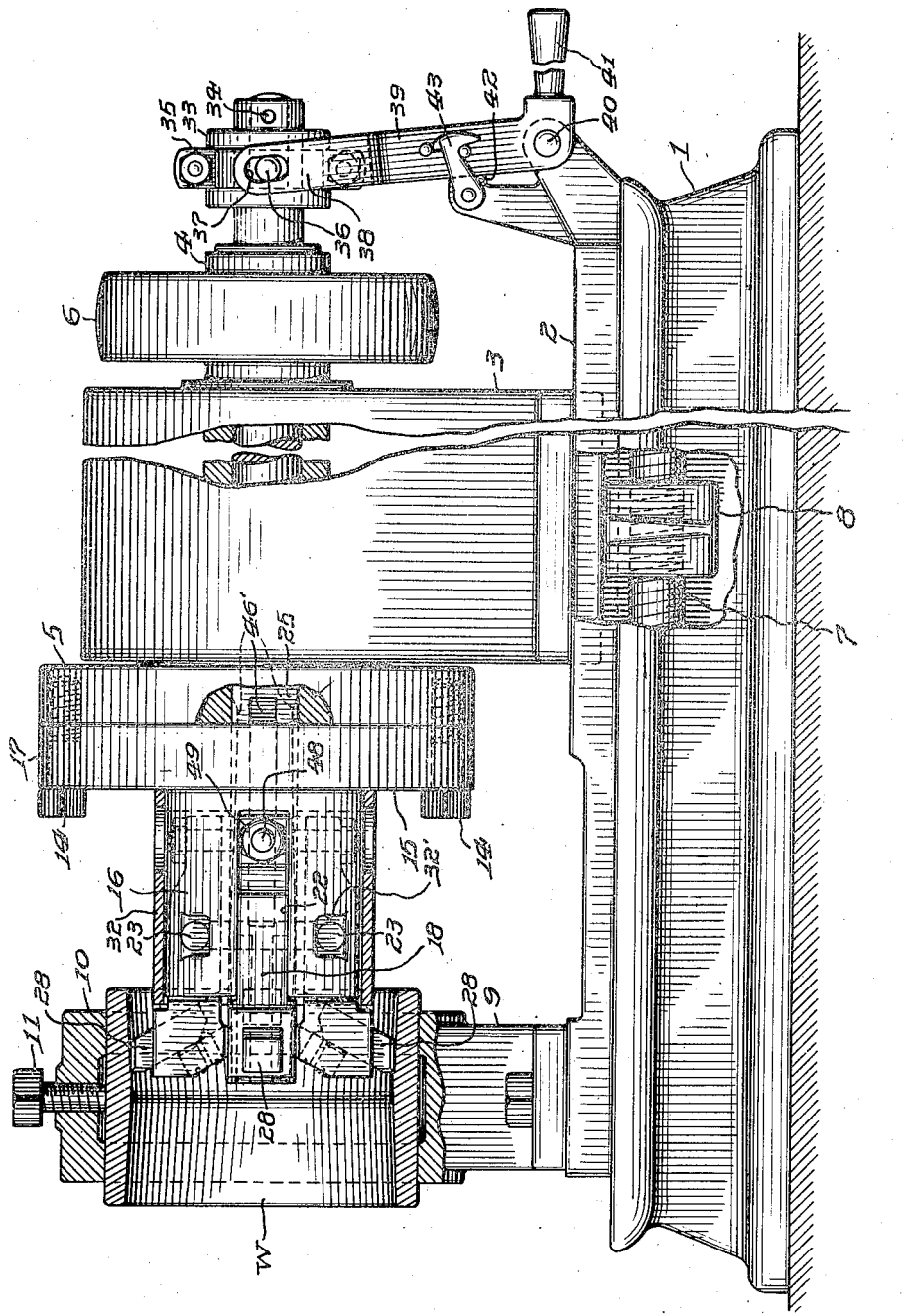

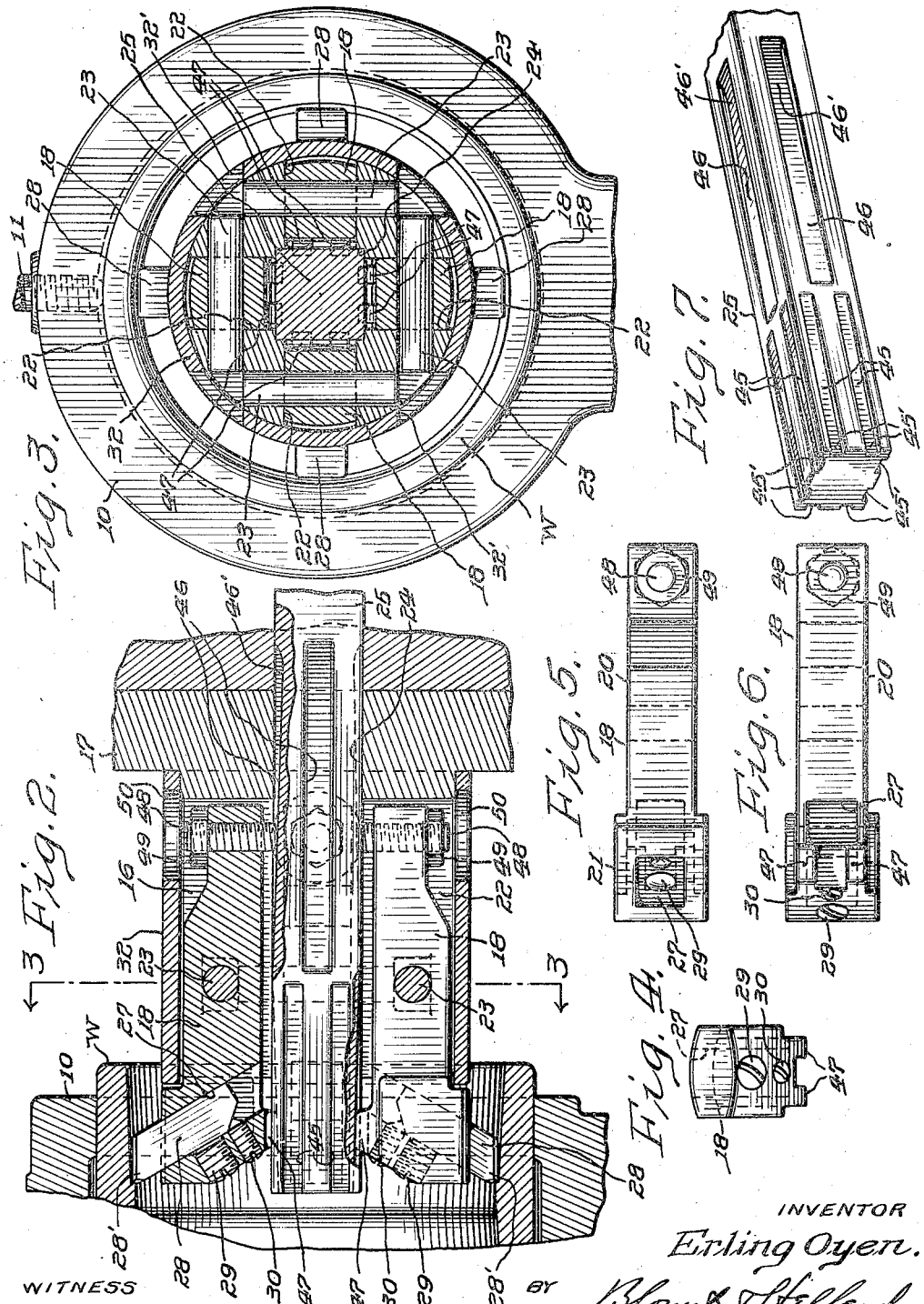

1,878,175

UNITED STATES PATENT OFFICE

ERLING OYEN, OF YOUNGSTOWN, OHIO

BORING TOOL FOR INTERNAL TAPER BORING

Application filed January 14, 1927. Serial No. 161,061.

The present invention relates to machines for forming tapered holes by a boring operation and more particularly to mechanism for imparting to the boring tool or cutter a gradual progressive movement toward or away from the axis about which the relative rotation of the work and tool takes place so as to produce the desired taper in the bore as it is formed.

Boring machines or mills as generally constructed embody, among other things, means for holding the piece or work which is to be bored, a rotatable shaft or spindle mounted in a housing and adapted to support the cutting tool or tools at one end, and means for effecting a relative longitudinal feed between the tool and the work so as to progressively carry the rotating tool into the work and thereby form the desired bore therein. Under these conditions if the cutting extremity of the tool is maintained at a constant distance from the axis about which it is rotating, a cylindrical bore will be formed in the work, but if the tool be gradually moved toward or away from such axis a tapered bore will result. Moreover, to prevent irregularities in the wall of the bore thus produced, it is obviously necessary that the movement of the tool be regular and smooth while, as the tool or cutter is necessarily subjected to enormous strains and stresses when a heavy cut is being taken, a firm and rigid support must at all times be accorded thereto if successive pieces of work are to be produced with the accuracy finish and within the tolerances required by modern machine shop practice.

It is therefore an object of my invention to provide in combination with a boring mill means adapted to effect the movements of the cutter or cutters requisite for the production of tapered bores and so constructed that at all times during the boring operation the cutters will be adequately and properly supported; which are simple in design and construction, not liable to get out of order under the conditions of operation to which machines of this character are ordinarily subjected, and capable of producing tapered bores in consecutive pieces of work in conformity with the usual requirements as to size and accuracy of taper.

Other objects, advantages and novel features of design, construction and arrangement comprehended by my invention are hereinafter more particularly described or will be apparent from the following description of a machine constructed in accordance with one form of the invention and illustrated in the accompanying drawings.

In the said drawings Fig. 1 is a front elevation of the machine showing a piece of work disposed in operative position therein and the cutters in the position they occupy when the boring operation is partially completed, certain parts of the machine being shown in vertical central section and other parts being broken away for the sake of clearness; Fig. 2 is an enlarged, fragmentary view of the cutter head and adjacent parts and also showing a portion of the work as in Fig. 1, this view being generally in central vertical section, certain parts, however, being shown in elevation and also fragmentarily broken into section; Fig. 3 is a transverse vertical section on line 3—3 in Fig. 2 looking in the direction of the arrows and with certain parts shown in elevation; Fig. 4 is a front end view of one of the tool holders removed from the boring head and with the tool removed therefrom, and Figs. 5 and 6 are respectively a top plan and a bottom plan view thereof, while Fig. 7 is a fragmentary perspective view of the track bar removed from the machine. Similar symbols are used to designate the same parts in the various figures.

A machine constructed in accordance with the present invention particularly lends itself to the taper boring of pipe couplings preparatory to threading and I have therefore shown a coupling blank in operative position in the machine but it is to be understood that taper boring of other forms of work may be performed on the machine with equal facility and that its use is therefore in no way restricted to any particular kind or class of work.

The particular embodiment of the invention which I have chosen to illustrate comprises a base 1 provided with horizontal ways 2 upon and adjacent one end to which is slidably disposed a housing 3; in this housing is rotatably mounted a spindle 4 carrying a face plate 5 and a pulley 6 which may be belted or otherwise connected to a suitable source of power for driving the spindle. The housing is arranged for longitudinal movement upon the ways and any suitable means (not shown) are provided for effecting this movement, conveniently through the medium of a feed screw 7 extended in the base and cooperative with an internally threaded lug 8 depending from the housing and through which the feed screw extends. These several parts are shown in the drawings in a merely conventional way since in one form or another they are found in most boring mills. Adjacent the opposite end of the base from that near which the housing is disposed, means are provided for holding the work or piece to be bored, and as said means may be of any form suitable to effect the desired result, I have merely shown a pedestal 9 secured to the base and supporting an annular chuck or collar 10 in which the work W may be secured by a set screw 11 so as to be held firmly in position although ordinarily, and as will be readily comprehended by those familiar with the art, the work holding means will comprise some more elaborate form of chuck or fixture capable of gripping the work at a plurality of points about its periphery and holding it with its central axis in substantial alignment with the axis of the spindle 4. It is therefore to be understood that for the purposes of the present invention the particular design, construction and arrangement of the several parts to which reference has hitherto been made may be varied as desired so long as they are so constructed as to hold the work and accomplish relative longitudinal movement between it and the spindle while the latter is rotating on its own axis.

Preferably removably but securely attached as by bolts 14 to the face plate 5 is a boring head, generally designated as 15, which comprises a cylindrical portion 16 having an integral flange 17 at one end adapted to rest against the face plate and through which the bolts 14 are extended. This head serves to support a plurality of tool holders 18, hereinafter more particularly described, and which are all of like construction. In the particular machine shown four of these tool holders are employed and arranged symmetrically about the axis of the head and while this is a desirable construction in that it enables a corresponding number of tools or cutters to be employed, a greater or lesser number of holders may under certain conditions be found preferable, but whatever be the exact number utilized it is ordinarily desirable to arrange them in opposed pairs on opposite sides of the axis of the head so that the thrust of the cutters on the head will be substantially equalized.

Each of the tool holders comprises a shank 20 preferably rectangular in cross section and an integral head 21 at the forward end thereof, the head being preferably somewhat wider than the shank. For the reception of the shanks of the holders the cylindrical portion or nose 16 of the head is provided with a plurality of longitudinally extending slots 22 arranged in diametrically opposed pairs and respectively extending radially inward from its outer surface. Each of these slots is of a width to snugly receive the shank of a tool holder and each holder is retained in position in its respective slot when disposed therein by a transversely extending pin 23 whose ends are seated in the portions of the head adjacent the sides of the slot and whose central portion where it bridges the slot forms a pivot about which the holder can oscillate.

At its center the head is cut out longitudinally to form a channel 24 for the reception of the rectangular track bar 25, hereinafter more particularly described, in such manner that, as best shown in Fig. 3, the corners of the bar will engage in the corners of the channel while the slots 22 are respectively continued inwardly to the channel so that the inner or under faces of the tool holders lie adjacent the faces of the bar.

In the head of each tool holder is formed a closed diagonally extending slot 27 of suitable configuration to snugly receive the tool or cutter 28 which is usually formed from a rectangular bar of suitable cutting steel, and which is adjustably held in position in the slot by a pair of set screws 29 and 30 extended through the forward end of the head so as to respectively bear on the face and against the beveled rear end of the tool as best shown in Fig. 2. This particular arrangement of the set screws is a convenient one for the reason that it is effective both to hold the tool very securely and also to facilitate its adjustment through coaction of the bevel point of the screw 30 and the correspondingly beveled end of the cutter but if desired any other means for securing the cutter in the holder may be utilized so long as it is effective to maintain the cutter securely in position. It will of course be understood that the forward or outer end 28' which forms the operative or cutting end of the tool is ground or otherwise sharpened in accordance with the usual practice so as to render it suitable for its intended function.

To prevent the accumulation of chips and the like in the vicinity of the shanks of the tool holders which might result in obstructing their movements of oscillation about their respective pivots, I preferably surround the major portion of the nose of the head with a tubular or hollow cylindrical shield 32 desirably forming a snug fit over the nose so as to be frictionally retained thereon but readily removable therefrom when desired. To facilitate assembly of the parts it will be noted that the shield is cut away to provide openings 32' in the vicinity of the ends of the several pins 23 so that after the shield is in position the tool holders may be slipped longitudinally into their respective slots from the forward end of the head and the pins then inserted through the openings 32'; with equal facility any or all of the tool holders may be removed by first driving out the pins by means of a drift inserted through the openings.

Mention has hitherto been made of the track bar 25 and this element will now be more particularly described. As best shown in Fig. 7 the forward end of this bar, that is, the end which lies adjacent the work, is rectangular in cross section; this rectangular portion is preferably of considerably greater length than the nose 16 and is adapted to extend in the channel 24 formed at the center of the head so that when thus positioned the bar, through the engagement of its corners with the corners of the channel, will be constrained to rotate with the head although relative longitudinal movement between the bar and the head is permitted. Preferably the rear portion of the bar may be cylindrical instead of rectangular in cross section and is extended entirely through the spindle 4 so as to project beyond the end thereof at which point any suitable means may be provided for moving the bar longitudinally with respect to the spindle but without interfering with its capacity for rotation therewith, said means, as shown, conveniently comprising a grooved collar 33 pinned or otherwise secured to the bar by a pin 34 so as to turn therewith and a strap 35 disposed in the groove of the collar and provided with outwardly directed trunnions 36 which engage in slots 37 in the ends of a yoke 38 disposed at one end of a bell crank lever 39 pivoted at 40 to the base 1 and provided with a handle 41 at its opposite end. Thus by moving the lever 39 about the pivot 40 by means of the handle the track bar may be moved longitudinally in the spindle through a limited distance. As it is desirable that the forward movement of the bar, that is, its movement toward the work, shall be arrested each time at exactly the same point I prefer to arrange a stop 42 of any suitable form in the path of the lever in such position that the forward movement of the latter will be limited by the stop, and to prevent the track bar from longitudinal movement during the boring operation I preferably provide a suitable latch 43 or like device adapted to releasably hold the lever 39 in engagement with the stop.

The office of the track bar is to cause a gradual movement of the tool holders about their respective pivots as the rotating boring head moves along the bar during the boring operation while, at the same time, affording a firm support to the tool holders and in turn the tools, and to this end each face of the bar is provided with oppositely directed inclined surfaces, each respectively cooperative with elements disposed near the opposite ends of the adjacent tool holder substantially equidistant from the center of its pivot pin whereby as the head moves relatively to the bar each holder will be gradually and progressively turned about its pivot so as to move its tool holding end radially with respect to the axis of rotation of the head which coincides with the center of the bar. More specifically, therefore, I may provide each face of the bar at its forward end with a pair of spaced grooves 45 whose bottoms 45' are inclined in correspondence with the taper which it is desired to produce in the work, the grooves being deepest at the forward end of the bar. In like manner I may provide each face of the bar in the rear of the grooves 45 with a single groove 46 whose bottom 46' is inclined in a direction opposite to the grooves 45, that is, each groove 46 is shallowest at its forward end and increases in depth toward its rear end. Each of the tool holders is provided adjacent its forward end and upon its under or inner face with a pair of spaced lugs 47 of suitable size to respectively engage in and bear upon the bottoms 45' of the grooves 45 while near its opposite end each holder is provided with a set screw 48, preferably carrying a lock nut 49, which is extended entirely through the holder and adapted to bear at its projecting inner end upon the bottom 46' of the groove 46. To enable the set screws to be reached for adjustment when desired I form an opening 50 in the shield 32 in alignment with each screw through which a socket wrench or other tool may be conveniently inserted. It will therefore be apparent that by moving the screws 48 inwardly against the bottoms of the slots 46 the several tool holders may be moved about their respective pivots until their lugs 47 bear snugly on the bottoms of slots 45, thus rendering each tool holder incapable of oscillation about its respective pivot so long as the track bar is not moved longitudinally relatively thereto but that when relative movement is effected between the head and the bar, the tool holders will be caused to slowly turn on their respective pivots as the lugs and screws ride along the inclined surfaces 45' and 46' with which they are respectively in engagement, thus moving the tool holding ends of the holders inwardly or outwardly in a radial direction with respect to the center of the bar in accordance with the direction of relative movement between the head and the bar.

The operation of the machine may now be briefly described as follows: The housing 3 is first preferably moved to the right or rear when viewed as in Fig. 1 for a sufficient distance to clear the cutters from the chuck or fixture in which the work is to be held, the work then positioned and secured in the chuck, and the track bar moved forward, that is, to operative position, by bringing lever 39 against its stop in which position it may be secured by latch 43. The housing is now moved to the left until the cutters are in contact or almost in contact with the work and the several cutters adjusted and secured in their respective tool holders by means of screws 29 and 30 so that the proper depth of cut will be taken to give the proper diameter at the larger end of the tapered bore which is to be formed, it being of course assumed that the several screws 48 have previously been adjusted so as to cause all of the lugs 47 and the screws 48 as well to snugly bear on the inclined surfaces 45' and 46' with which they are respectively adapted to engage. Power is now supplied to the machine through pulley 6 or other driving means so as to rotate the spindle and head while the housing feed screw 7 or other housing feed mechanism is also operated so as to cause relative longitudinal movement between the work and the rotating head, thus causing the cutters to be gradually advanced into the work, the rate of such advance being of course determined by the manner in which the feed is operated. As the track bar, however, is operatively locked to the base, it is incapable of moving longitudinally with respect to the work with the result that as the housing and boring head gradually move forwardly the cooperative engagement of the inclined surfaces on the track bar with the lugs 47 and screws 48 carried by the several tool holders gradually and simultaneously rotate the latter about their pivots so as to gradually move the tool carrying ends of the holders, and in turn the tools, radially inward with resulting production of a tapered bore in the work, the inclination of the surface of which is determined by the inclination of the surfaces 45' on the track bar.

When the bore has been completed to the desired depth or length, the power may be shut off from the spindle so as to prevent its further rotation and the track bar then withdrawn rearwardly by operation of lever 39. This movement of the bar is effective to cause a still further inward retraction or movement of the tools so as to entirely clear them from the work preparatory to operation of the housing feed in reverse direction so as to move the housing and head rearwardly and withdraw the cutters from the bore, thereby enabling the work to be conveniently unchucked and removed from the machine.

I consider it preferable to dispose the inclined surfaces on the track bar at the bottom of grooves therein as best shown in Fig. 7 and to form the lugs 47 so as to snugly engage the side walls of the grooves, since this construction tends to steady the tool holder and assists in resisting the lateral thrust thereon which is very great when a heavy cut is being taken in the work.

While it is generally more convenient to operate the machine in substantially the manner hitherto described, that is, so as to cause progressive inward radial movement or retraction of the cutters, it will be apparent that it may be operated with equal facility so as to cause the tool holding ends of the tool holders to move gradually radially outwardly by simply operating the housing feed in reverse direction, thereby causing the bearing elements or lugs 47 to ride upwardly along the adjacent inclined surfaces of the track bar instead of downwardly thereon. This method of operation may under certain conditions be found advantageous, for example, when it is desired to form a taper bore progressively from its smaller to its larger end instead of from its larger end to its smaller, it being of course understood that whatever be the precise method of operation employed the cutting tools will be appropriately ground to enable the cut to be properly taken.

It will be further apparent that it is immaterial for the purposes of the invention whether, as in the particular embodiment thereof to which I have referred, the work be held stationary and the boring head rotated and moved longitudinally with respect thereto and to the non-longitudinally movable track bar or whether the work and the track bar be moved longitudinally with respect to the head, so long as relative rotation between the cutters and the work and relative longitudinal movement between the work and track bar, on one hand, and the tool holders on the other is simultaneously effected.

While I have herein illustrated and described with considerable particularity one form of machine constructed in accordance with my invention, I do not thereby desire or intend to confine myself specifically thereto since numerous changes and modifications may be made in the design, construction and arrangement thereof if desired without departing from the spirit and scope of the invention as defined by the appended claims.

Having thus described my invention, I claim and desire to protect by Letters Patent of the United States:

1. In boring mechanism, a rotatable boring head having a plurality of radial slots and a central longitudinally extending channel, a tool holder pivotally supported in each of said slots, a track bar polygonal in cross section extending in said channel and rotatable with the head, said bar being provided with longitudinally extending oppositely inclined bearing surfaces respectively adjacent the opposite ends of each of said holders, a lug adjacent one end of each holder adapted to bear on the adjacent inclined bearing surface of the bar, an adjusting screw adjacent the other end of each holder adapted to bear on the other adjacent but oppositely inclined bearing surface, and means operable to cause relative longitudinal movement between the bar and the head so as to move the lug and screw of each holder over the inclined bearing surfaces respectively adjacent thereto and thereby gradually turn all of said holders simultaneously about their respective pivots during the boring operation.

2. In boring mechanism, a rotatable boring head having a plurality of radial slots arranged in diametrically opposed pairs and a central channel, a tool holder pivotally mounted in each of said slots on an axis extending at right angles to the axis of the channel, a track bar extending through the channel and provided adjacent each tool holder with longitudinally extending grooves whose bottoms are respectively inclined toward the axis of the bar in opposite directions from the pivotal center of the holder, means carried by each holder adjacent its ends respectively adapted to enter the adjacent grooves and engage the bottoms thereof, and means operative during the boring operation to cause relative longitudinal movement between the head and the bar whereby all of the holders are gradually turned about their respective pivots so as to move their respective ends in opposite directions from the axis of the bar.

In witness whereof, I have hereunto set my hand this 12th day of January, 1927.

ERLING OYEN.